Nov. 11, 1924.  1,514,869
A. SOLOSABAL ET AL
DIRIGIBLE MECHANISM FOR HEADLIGHTS
Filed Sept. 25, 1922    2 Sheets-Sheet 1
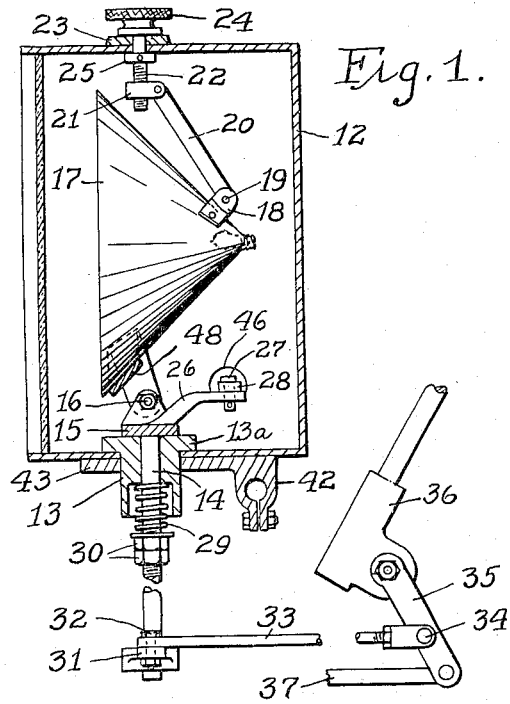
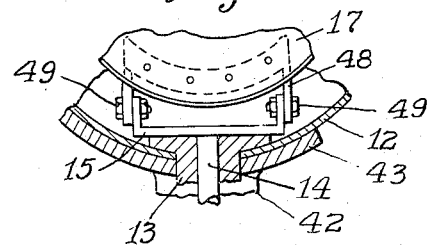
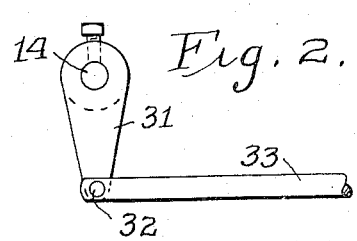
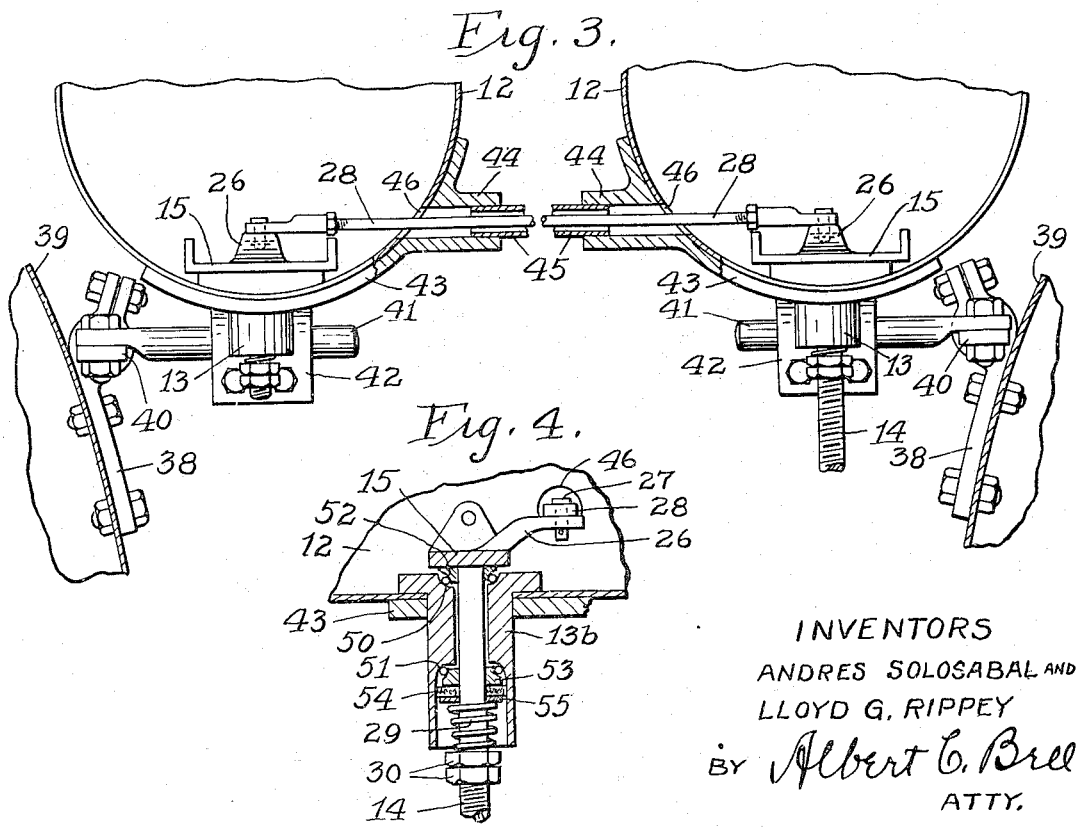
INVENTORS
ANDRES SOLOSABAL AND
LLOYD G. RIPPEY
BY Albert C. Bree
ATTY.

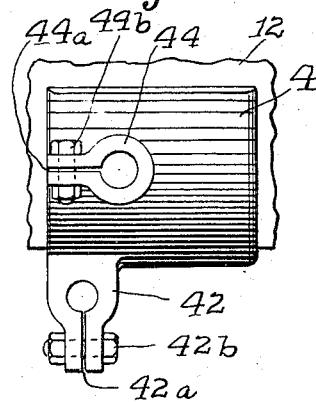
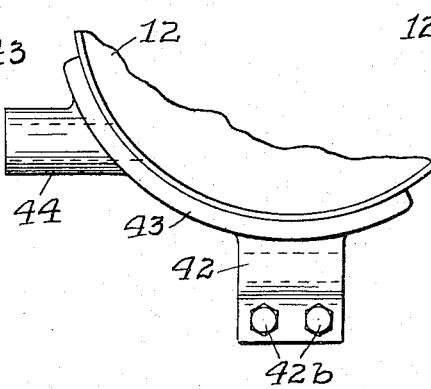
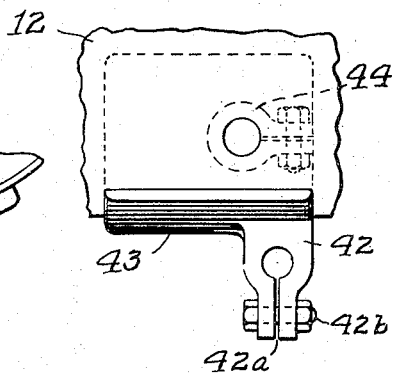
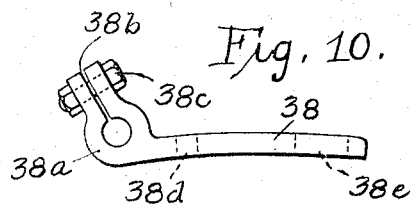
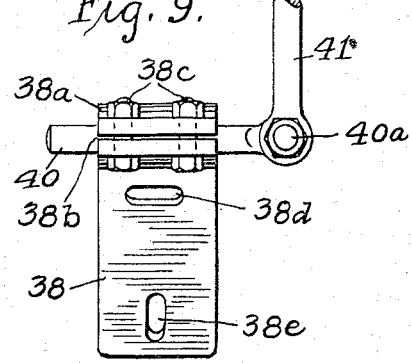
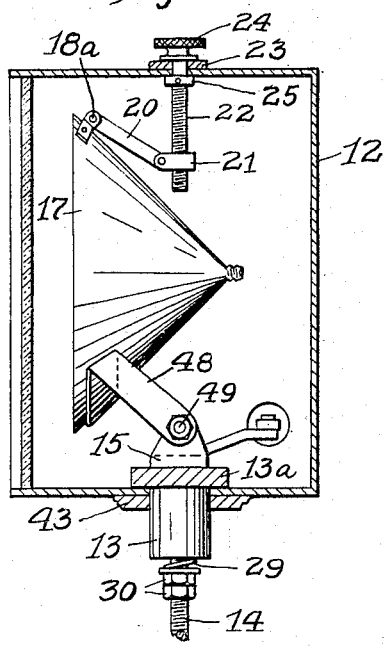

Patented Nov. 11, 1924.

1,514,869

UNITED STATES PATENT OFFICE.

ANDRES SOLOSABAL, OF BOISE, IDAHO, AND LLOYD G. RIPPEY, OF LOS ANGELES, CALIFORNIA.

DIRIGIBLE MECHANISM FOR HEADLIGHTS.

Application filed September 25, 1922. Serial No. 590,259.

*To all whom it may concern:*

Be it known that we, ANDRES SOLOSABAL, residing at Boise, in the county of Ada and State of Idaho, and LLOYD G. RIPPEY, residing at Los Angeles, in the county of Los Angeles and State of California, both citizens of the United States, have invented a new and useful Improvement in Dirigible Mechanism for Headlights, of which the following is a specification.

Our invention relates to an improved construction of dirigible mechanism for headlights for use on motor vehicles and consists essentially of novel means for mounting the headlights on the vehicle and for rotating the reflectors of the headlights in their casings by operation of the standard steering mechanism of the vehicle, when said steering mechanism is operated to turn the vehicle in one direction or the other. By our invention we also provide an improved means for changing the inclination of the axes of the reflectors of the headlights, upwardly or downwardly as desired, so that the roadway may be given the desired illumination, without however interfering with the turning of the reflectors in their casings laterally of the vehicle, when the steering wheels of the vehicle are operated to change its direction.

Our invention will best be understood by reference to the accompanying drawings showing preferred embodiments thereof, in which—

Fig. 1 shows one of a pair of headlights in accordance with our invention and the manner of connecting it for operation with the steering mechanism of the vehicle, Fig. 2 shows in plan view a part of the operating connections illustrated in Fig. 1, Fig. 3 shows a pair of headlights in front elevation with the reflectors removed to more clearly show the relation of the operating mechanism, and this figure also shows the manner of mounting the headlights from the fenders of the vehicle, Fig. 4 is a vertical, sectional view of a modified form of mounting mechanism for the reflectors of the headlights, Fig. 5 shows in front elevation the manner of connecting one of the reflectors to its rotatable support, Fig. 6 shows in front elevation a part of the casing of one of the headlights and the clamping device carried thereby for securing the casing in desired position, Fig. 7 is a right hand side elevation of the parts shown in Fig. 6, Fig. 8 is a left hand side elevation of the parts shown in Fig. 6, Fig. 9 is a detail plan view of one of the clamps used to secure the headlights and attached mechanism to the fenders of the vehicle, Fig. 10 is an edge view of the clamp shown in Fig. 9, and Fig. 11 shows in a view similar to Fig. 1 a modified construction of headlight.

Similar numerals refer to similar parts throughout the several views.

As shown in Fig. 1, the casing 12 of the headlight is provided in its lower portion with a cylindrical supporting member 13 having within the casing an enlarged head or flange 13$^a$. The member 13 is provided with a bore extending in a vertical direction to receive a shaft 14 to the upper end of which a yoke 15 is rigidly secured, said shaft being readily rotatable in the member 13. The yoke 15 is pivotally connected at 16 with the lower portion of the reflector 17 to support said reflector in desired position in the casing 12. The upper outer surface of the reflector is provided with an outwardly projecting ear 18 pivotally connected at 19 with a link 20 the other end of which is pivotally connected with a threaded block 21 engaged by a screw 22 projecting downwardly through the upper portion of the casing 12 in line with the shaft 14. A bearing plate 23 is provided on the casing to support the screw 22 and the outer end of said screw has rigidly secured thereto, a knurled head 24 by which the screw may readily be turned in one direction or the other. A retaining collar 25 is rigidly secured to the screw 22 inside of the casing thus preventing longitudinal movement of the screw through the casing. As a result of the construction described turning the screw 22 in a direction to move the block 21 downwardly tilts the axis of the reflector upwardly and motion in the reverse direction of the screw 22, moves the reflector 17 to tilt its axis downwardly, thus affording a ready means for throwing the light from the reflector in the desired position on the roadway. It will be observed that adjustment of the reflector 17 in the manner described, does not in any way interfere with turning it by means of the shaft 14, since the screw 22 is in line with said shaft and turns with it and with the block 21 when the shaft is turned to swing the reflector laterally by the steering of the vehicle.

The yoke 15 has extending rearwardly therefrom an arm 26 pivotally connected at 27 with a connecting rod 28 extending horizontally to the reflector operating mechanism of the other headlight in a manner to be described.

The lower end of the member 13 is preferably counterbored as indicated, to receive the spring 29, which may be given a desired tension by the lock nuts 30 on the shaft, to hold the yoke 15 in frictional engagement with the upper surface of the member 13 to any desired degree. The shaft 14 is extended downwardly below the lock nuts 30 and at its lower end has rigidly secured to it a crank arm 31 which, as more clearly shown in Fig. 2, is pivotally connected at 32 with one end of a connecting rod 33, the other end of which as shown in Fig. 1, is pivotally connected at 34 with a crank arm 35 forming a part of the standard steering mechanism 36 of the vehicle. The arm 35 is connected by means of a rod 37 with the steering devices of the vehicle, not shown, in a manner well known in the art.

As shown in Fig. 3, the headlights of the vehicle are supported in proper position by means of clamps 38 secured to the fenders 39 of the vehicle in suitable manner, as for example by bolts, which clamps rigidly support the rods 40, to the ends of which transverse rods 41 are hinged, extending through clamps 42 carried by and projecting downwardly from the lower portions of the mounting plates 43 secured to the casings 12 of the headlights. Each of the mounting plates 43 has extending towards the other headlight, a second clamp 44 provided with a bore for receiving one end of a connecting pipe 45 by which the casings of the headlights are securely held laterally and prevented from turning in the clamps 38. Openings 46 are provided through the casings 12 in line with the bores of the clamps 44 and through these openings 46 and the pipe 45, the connecting rod 28 extends to connect together the arms 26 of the two headlights, to effect simultaneous rotation of the yokes 15 and therefore of the reflectors 17.

As indicated in Fig. 5, each of the reflectors 17 is provided with a yoke 48 the ends of which are pivotally connected, for example by suitable bolts 49, with the ends of the yoke 15 thus affording a transverse horizontal axis on which the reflector 17 may be tilted by the operation of the screw 22.

If desired, the yoke 15 may be provided with ball bearings as shown in Fig. 4, by forming suitable ball races 50 and 51 in the upper and lower ends of the member $13^b$ and placing bearing cones 52 and 53 on the shaft 14 above and below said ball races, antifriction balls being interposed between the cones and ball races as indicated. A felt washer 54 is preferably disposed below the cone 53, said washer being held in place by a metal washer 55 engaged by the upper end of the spring 29 held compressed by the lock nuts 30 to give the bearings any desired adjustment.

As shown in Figs. 6, 7 and 8 the clamp 42 extending downwardly from the mounting plate 43 to engage the rod 41, consists of a boss provided with a bore fitting said rod and slotted outwardly from said bore as indicated at $42^a$, clamping bolts $42^b$ extending through the slotted portions as indicated, to clamp the opposite portions of the boss against the rod 41 when the headlight is in the desired position. As also shown in these figures, each of the clamps 44 consists of a boss extending laterally from the mounting plate, provided with a bore of substantially the same diameter as the outer diameter of the pipe 45, said boss being slotted outwardly from said bore as indicated at $44^a$ and provided with clamping bolts $44^b$ for clamping the opposite portions of the boss against the pipe 45 when the headlight casings are in desired adjustment.

As shown in Figs. 9 and 10 each of the clamps 38 consists of a base portion from one end of which a boss $38^a$ projects, which is provided with a bore of substantially the same size as the rod 40, said boss being slotted outwardly from said bore as indicated at $38^b$ and provided with clamping bolts $38^c$ for clamping opposite portions of said boss against the rod 40 when the headlight casings are in desired adjustment. As indicated in Fig. 9 the rods 40 and 41 are hinged together as indicated at $40^a$, the hinged connection preferably comprising a bolt for securely holding the rods together. To facilitate accurately mounting each of the clamps 38 on the fender of the vehicle a first slot $38^d$ is formed through the base portion of said clamp, preferably laterally thereof, adjacent the boss $38^a$ and at the other end of said clamp a second slot $38^e$, preferably extending longitudinally of the clamp is formed therethrough to facilitate convenient adjustment of the clamp upon the corresponding fender 39, before tightening the clamping bolts extending through said clamp and fender.

In Fig. 11 a modified connection of the reflector 17 to the screw 22 is shown in which the reflector is provided with an outwardly extending ear $18^a$ from the uppermost portion of its outer surface, the screw 22 and the shaft 14 being in alignment with each other as before but in this case placed nearer the rear wall of the casing 12 than with the construction shown in Fig. 1. The operation of this construction in tilting the axis of the reflector upwardly or downwardly is the same as above described.

It will be observed from the above, that we not only provide an effective means for mounting headlights from the fenders of a vehicle and for turning the reflectors of said headlights on vertical axes by the operation of the steering mechanism of the vehicle, but also a means for accurately directing the light beam vertically from each reflector relatively to the roadway, independently of the other headlight and of the mounting and turning means, to the end that the light beam from each reflector may be directed downwardly just enough to be below the line of sight of pedestrians and the drivers of other vehicles and properly illuminate the roadway without any decrease in the intensity of the light. In this manner we avoid glare from the headlights without the use of any diffusing or shielding devices whatever, and the loss of illumination incident thereto.

While we have shown our invention in the particular embodiments above described, it will be understood that we do not limit ourselves to this exact construction but that we may employ equivalents known to the art at the time of the filing of this application without departing from the scope of the appended claims.

What we claim is:

1. In a headlight, the combination of a casing, a vertical pivot member extending through the lower portion of the casing and adapted for operating connection with the steering devices of a motor vehicle, a reflector in said casing, a hinge connection between said reflector and said pivot member permitting a rocking movement of said reflector vertically on said pivot member, and a vertical pivot connection between the upper portion of said reflector and said casing including manually operable devices for moving the axis of the reflector upwardly or downwardly as desired in a vertical plane through said vertical pivot member and said vertical pivot connection, whereby angular movement of said vertical pivot member automatically by steering devices of a vehicle correspondingly moves said reflector angularly in a horizontal plane and movement of said manually operable devices moves said reflector angularly in a vertical plane on said hinge connection.

2. In a headlight, the combination of a casing, a vertical pivot member extending through the lower portion of the casing and adapted for operating connection with the steering devices of a motor vehicle, a reflector in said casing, a hinge connection between said reflector and said pivot member permitting a rocking movement of said reflector vertically on said pivot member, and a vertical pivot connection between the upper portion of said reflector and said casing including manually operable devices for moving the axis of the reflector upwardly or downwardly as desired in a vertical plane through said vertical pivot member and said vertical pivot connection, whereby angular movement of said vertical pivot member automatically by steering devices of a vehicle correspondingly moves said reflector angularly in a horizontal plane and movement of said manually operable devices moves said reflector angularly in a vertical plane on said hinge connection, said vertical pivot member comprising a vertical shaft extending through said casing, a yoke secured to the inner end of said shaft to support said hinge connection and said reflector, a bearing member in said casing supporting said yoke, and retaining devices on said shaft outside of said casing including a spring tending to hold said yoke on said bearing member.

3. In a headlight, the combination of a casing, a vertical pivot member extending through the lower portion of the casing and adapted for operating connection with the steering devices of a motor vehicle, a reflector in said casing, a hinge connection between said reflector and said pivot member permitting a rocking movement of said reflector vertically on said pivot member, and a vertical pivot connection between the upper portion of said reflector and said casing including manually operable devices for moving the axis of the reflector upwardly or downwardly as desired in a vertical plane through said vertical pivot member and said vertical pivot connection, whereby angular movement of said vertical pivot member automatically by steering devices of a vehicle correspondingly moves said reflector angularly in a horizontal plane and movement of said manually operable devices moves said reflector angularly in a vertical plane on said hinge connection, said manually operable devices comprising a vertical rod angularly movable in said casing and projecting therethrough, said rod having a threaded portion, a block on said rod movable vertically by said threaded portion and a link pivotally connecting said reflector and said block.

4. In a headlight, the combination of a casing, a vertical pivot member extending through the lower portion of the casing and adapted for operating connection with the steering devices of a motor vehicle, a reflector in said casing, a hinge connection between said reflector and said pivot member permitting a rocking movement on said reflector vertically on said pivot member and a vertical pivot connection between the upper portion of said reflector and said casing including manually operable devices for moving the axis of the reflector upwardly or downwardly as desired in a vertical plane through said vertical pivot member and said vertical pivot connection, whereby angular movement of said vertical pivot member automatically by steering devices of a vehicle correspondingly moves said reflector angularly in a horizontal plane and movement of said manually operable devices moves said reflector angularly in a vertical plane on said hinge connection, said vertical pivot member comprising a vertical shaft extending through said casing, a yoke secured to the inner end of said shaft to support said hinge connection and said reflector, a bearing member in said casing supporting said yoke, retaining devices on said shaft outside of said casing including a spring tending to hold said yoke on said bearing member, an arm extending laterally from said yoke, a second headlight having a similar construction, and a rod extending through the headlight casings and pivotally connected with said yoke arms to effect simultaneous movement of said reflectors laterally.

In witness whereof, we hereunto subscribe our names this 16th day of September, A. D. 1922.

ANDRES SOLOSABAL.
LLOYD G. RIPPEY.